US007212392B2

(12) United States Patent
Walker et al.

(10) Patent No.: US 7,212,392 B2
(45) Date of Patent: May 1, 2007

(54) PERSONAL BODY GROUNDING SYSTEM INSTRUMENTATION AND PROCESS

(75) Inventors: Douglas W. Walker, Ventura, CA (US); Frank M. Ordaz, Oxnard, CA (US); Jerome D. Fournier, Ojai, CA (US); Clinton Ober, West Covina, CA (US)

(73) Assignee: Earth FX, West Covina, CA (US)

( * ) Notice: Subject to any disclaimer, the term of this patent is extended or adjusted under 35 U.S.C. 154(b) by 0 days.

(21) Appl. No.: 11/164,387

(22) Filed: Nov. 21, 2005

(65) Prior Publication Data

US 2006/0285266 A1 Dec. 21, 2006

Related U.S. Application Data

(60) Provisional application No. 60/595,208, filed on Jun. 15, 2005.

(51) Int. Cl.

| | |
|---|---|
| ***H01H 47/00*** | (2006.01) |
| ***H05F 3/00*** | (2006.01) |
| ***H05F 3/02*** | (2006.01) |
| *H02H 1/00* | (2006.01) |
| *H02H 1/04* | (2006.01) |
| *H02H 3/22* | (2006.01) |

(52) U.S. Cl. ........................ 361/220; 361/212; 361/92

(58) Field of Classification Search ................ 361/220, 361/212, 92

See application file for complete search history.

(56) References Cited

U.S. PATENT DOCUMENTS 6,683,779 B2 * 1/2004 Ober .......................... 361/220

* cited by examiner

*Primary Examiner*—Stephen W. Jackson
*Assistant Examiner*—Dharti H. Patel
(74) *Attorney, Agent, or Firm*—Kelly Lowry & Kelley LLP

(57) ABSTRACT

An improved personal body grounding system includes a grounding pad having two or more ground leads conductively coupled to one or more grounded anchors having multiple ground contact points. A monitor tests the continuity to ground using the circuit created by the multiple ground contact points. The monitor includes multiple safety features in the event of a power surge. The system also includes an electrical meter to measure the personal body voltage of a user and a voltage gauge for measuring continuity to ground.

22 Claims, 7 Drawing Sheets

FIG. 2
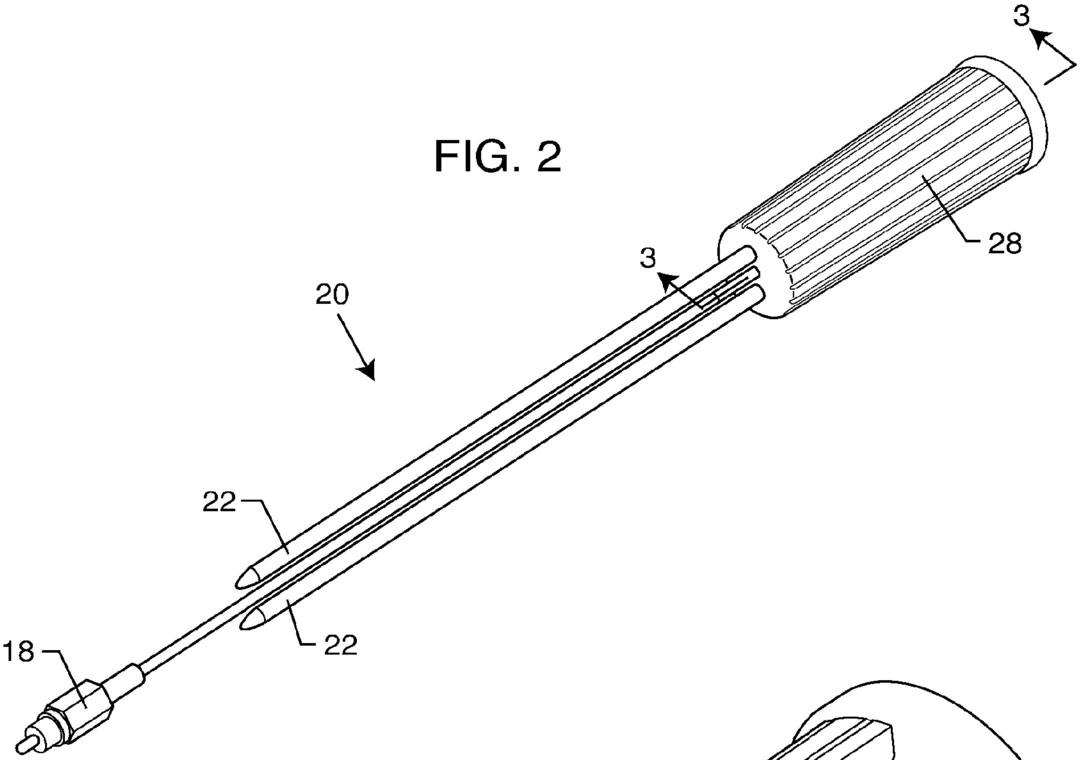
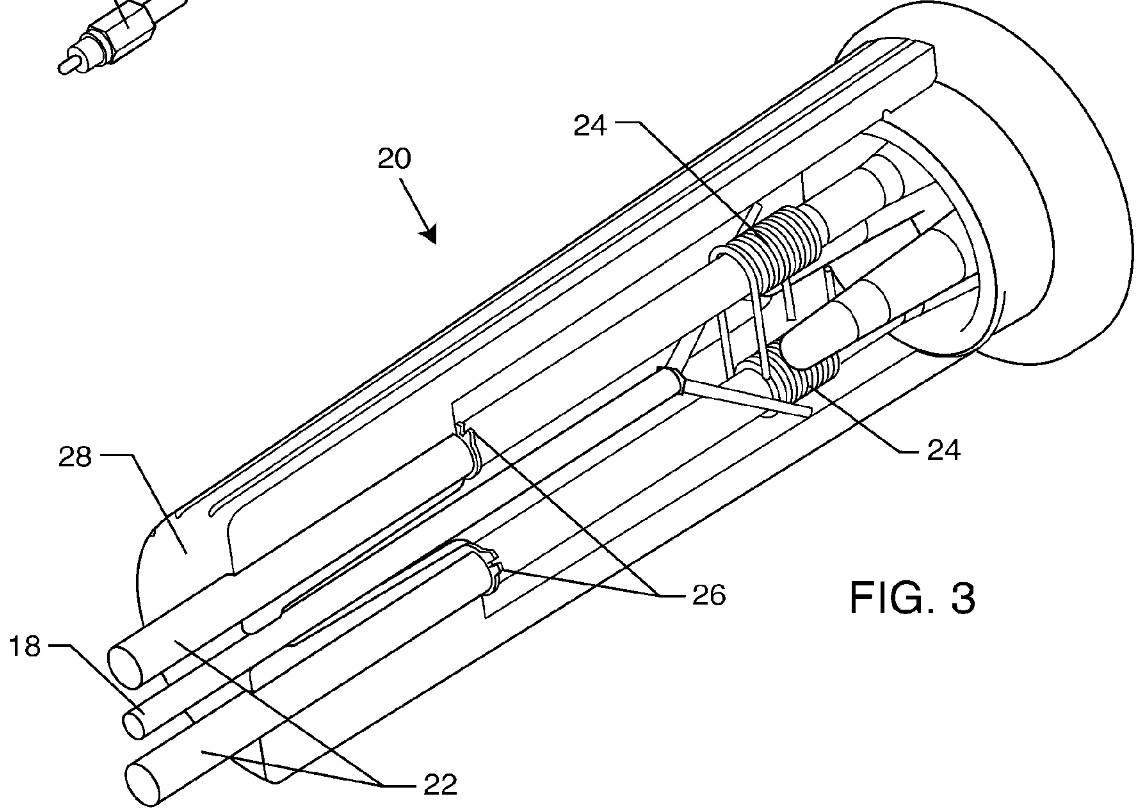
FIG. 3

PERSONAL BODY GROUNDING SYSTEM INSTRUMENTATION AND PROCESS

BACKGROUND OF THE INVENTION

The present invention relates to grounding systems. More particularly, the present invention relates to an improved personal body grounding system for collecting and removing electrical charges from a human body.

A personal body grounding system has been described in U.S. Pat. No. 6,683,779. ("the '779") The system of the '779 patent comprises an electrically conductive grounding pad having a ground lead extending therefrom that is conductively coupled to a grounded anchor. The grounding pad has a layer of carbon fibers in a conductor substantially extending across the layer in conductive contact with the carbon fibers. The ground lead is conductively coupled to the grounding pad conductor at one end thereof. The systems includes a single ground lead extending from the grounding pad conductively coupled to a single grounded anchor providing only one ground contact point for the system. Although, the system of the '779 patent has been shown to reduce electrical charges from the body and enhance the physiological well-being of the human body with some efficacy, it could be improved.

Therefore, it is desirable to enhance the efficacy of the personal body grounding system in the '779 patent. One such enhancement could include providing multiple ground contact points either through a single anchor with multiple rods or multiple grounding anchors. Other enhancements could include physical instrumentation, i.e., a monitor and/or conductivity meter. Other operative and functional improvements to the basic system are also contemplated. The objective of these enhancements is to make the system easier to operate, more accurate, and safer.

Accordingly, there is a need for an improved body grounding system that collects and removes electrical charges from a human body with greater efficacy, while being easier, safer, and more accurate to use.

SUMMARY OF THE INVENTION

The present invention relates to an improved personal body grounding system for collecting and removing excess internal and extraneous electrical charges from a human body in order to return the body to its natural electrically neutral state. The improved system generally comprises a grounding pad having a sitting or sleeping pad including a mesh layer substrate comprised of a plurality of electrically conductive fibers and a conductor in conductive contact with the fibers. The conductor may extend substantially across the entire mesh layer substrate. The mesh layer substrate is comprised of a plurality of carbon fibers and the conductor is conductively connected to these carbon fibers. The grounding pad is configured to make field or conductive contact with a human body. Two or more ground leads are conductively coupled to the grounding pad conductor at a first end. A grounding anchor is conductively coupled to second ends of the ground leads. The grounding anchors provide multiple ground contact points.

The grounding pad may comprise multiple conductors wherein the ground leads are each electrically connected to a separate conductor. The grounded anchor may consist of a single anchor having dual grounded rods or multiple anchors each having single grounded rods. Each of the separate grounded rods are connected to a separate ground lead extending from the grounding pad.

The system of the present invention includes a monitor that permits a user to initiate a short duration electrical signal to check continuity to ground. This ground continuity device may be located on or near the grounding pad or on the grounded anchor. In addition, the monitor may be configured for automatic and/or continuous signal generation without being initiated by the user. The electrical signal generated by the ground continuity device may be either Direct Current (DC) or Alternating Current (AC). It is preferable that the device generate an AC signal.

When the monitor is located on or near the grounding pad, it may be capable of displaying the ground status of the system. The monitor may also include other safety features. The monitor may include a fuse to prevent or minimize the effects of a sudden electrical power surge. Such a power surge may arise where the system is improperly grounded or a conductive powered appliance or power line contacts the user, the grounding pad, or the grounded anchor.

The monitor may also include a capacitor or capacitor/resistor combination in order to create an open circuit safety in the event of a sudden power surge. Similarly, the monitor may include a transistor, op-amp or similar active powered inline circuit, i.e., ground fault interrupter (GFI). In addition, the system may include an inherent resistive load to decrease electrical current potentially transmitted through the user.

The system of the present invention may also include a digital or analog personal meter capable of measuring the personal body voltage of the user. The personal meter may include a gold plated membrane or other electrical contact/activation point.

The monitor may include a signal or indicator, i.e., LED lights or audible annunciator, to alert the user to the status of any or all of the above mentioned safety features. The monitor may also include one or more ports or couplings through which a user may connect various combinations of system components, i.e., grounded anchors, electrical meters, grounding pads, or other grounding devices.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2 is a perspective view of a grounded anchor with ground lead embodying the present invention;

FIG. 3 is a cross-sectional view taken generally along line 3—3 of FIG. 2, illustrating the internal configuration of a grounded anchor of the present invention;

DETAILED DESCRIPTION OF THE PREFERRED EMBODIMENTS

Figure 1:
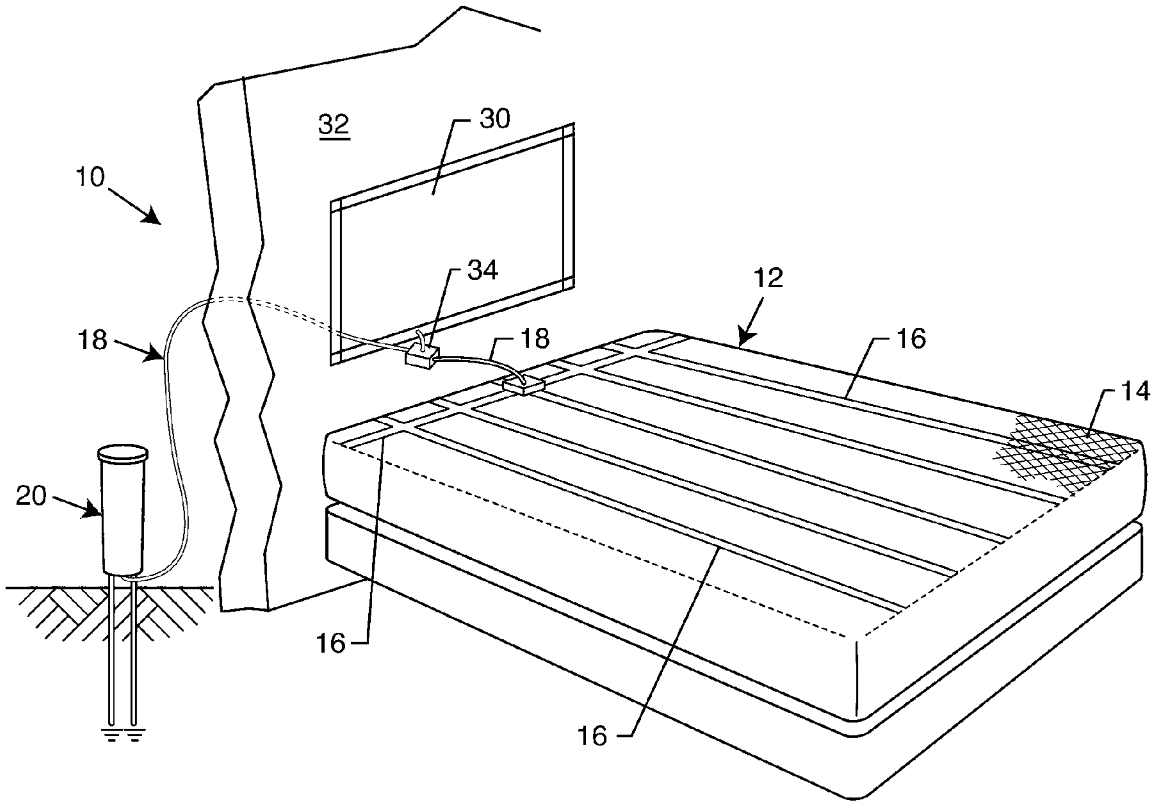
FIG. 1 is a schematic view of a personal grounding system embodying the present invention, the system comprising a sleeping pad positioned on a mattress and directly connected to a grounded anchor.

As shown in the drawings for purposes of illustration, the present invention is concerned with a system for grounding human bodies, generally referred to by the reference number 10 in FIG. 1. The system 10 is designed to collect and remove electrical charges from a human body.

With reference to FIG. 1, the system 10 includes a grounding pad 12 in the form of a sleeping pad in the depicted embodiment. The grounding pad 12 includes a mesh layer substrate 14 which is comprised of a plurality of carbon fibers. One or more conductors 16 substantially extend across the carbon fiber substrate 14 so as to be in conductive contact with the carbon fibers. Although as few as one conductor 16 may be used, preferably a plurality of conductors 16 are used and spaced from one another and interconnected in order to effectively conduct electrostatic charges from the carbon fiber substrate 14.

Two or more ground leads 18 are each connected at a first end thereof to a conductor 16 of the grounding pad 12. In a preferred embodiment, the two or more ground leads 18 comprise a single cable having twin wires composed of a conductive material, such as copper. The twin wire ground leads 18 are of sufficient length to extend from the grounding pad 12 to a grounded anchor 20 which is preferably placed directly into the earth. The ground leads 18 may extend from the grounding pad 12 and through a window 30 or other aperture of a wall 32 of a house and into electrical contact with the grounded anchor 20.

In the preferred embodiment, the grounded anchor 20 comprises a single unit having dual ground rods 22. However, an alternate embodiment may comprise multiple grounded anchors 20 each having at least one ground rod 22. In either embodiment, each ground rod 22 is connected to a single wire ground lead 18 extending from the grounding pad 12.

With reference to FIGS. 2 and 3, the grounded anchor 20 of the preferred embodiment comprises dual ground rods 22 connected to spring contacts 24 enclosed within a housing 28 and held in place by retaining rings 26. The ground leads 18 pass through the housing 28 and are secured to the ground rods 22 by means of the spring contacts 24.

The dual ground rods 22 of the grounded anchor 20 contact the earth/ground substrate in two or more places allowing the creation of a closed circuit or loop. This closed circuit or loop permits the system 10 of the present invention to check and ensure continuity to ground. An anchor which is earth grounded will allow an electrical signal to conduct to another independent anchor and thus close an electrical loop. This feature takes advantage of the inherent electrochemical nature of a proper earth ground to conduct an electrical signal. A close loop electrical signal may be generated by a monitor 34 (FIGS. 4 and 5) to test that the system 10 is properly grounded. This is very advantageous to a user in that he/she would know the personal grounding system 10 is properly set up.

In the preferred embodiment, this electrical signal would be of short duration and initiated by a user so as to not interfere with the grounding system 10. However, a monitor 34 that generates an automatic and/or continuous electrical signal may also function properly.

Either a direct current (DC) or alternating current (AC) electrical signal may be used to test continuity to ground. An AC electrical signal is used in the preferred embodiment. A DC electrical signal may create an undesired ongoing or residual galvanic potential voltage difference between the multiple ground rods 22 in the earth. This disadvantageous electrochemical effect could result in impaired testing of continuity to ground. Using a DC signal may also cause impurities to collect on the metallic ground rods 22. This phenomenon would be due to adverse electrochemical reactions between the ground rods 22 and the earth, and this may cause further interference with continuity monitoring. The use of an AC electrical signal prevents both the galvanic interference as well as the build-up of impurities.

Figure 5:
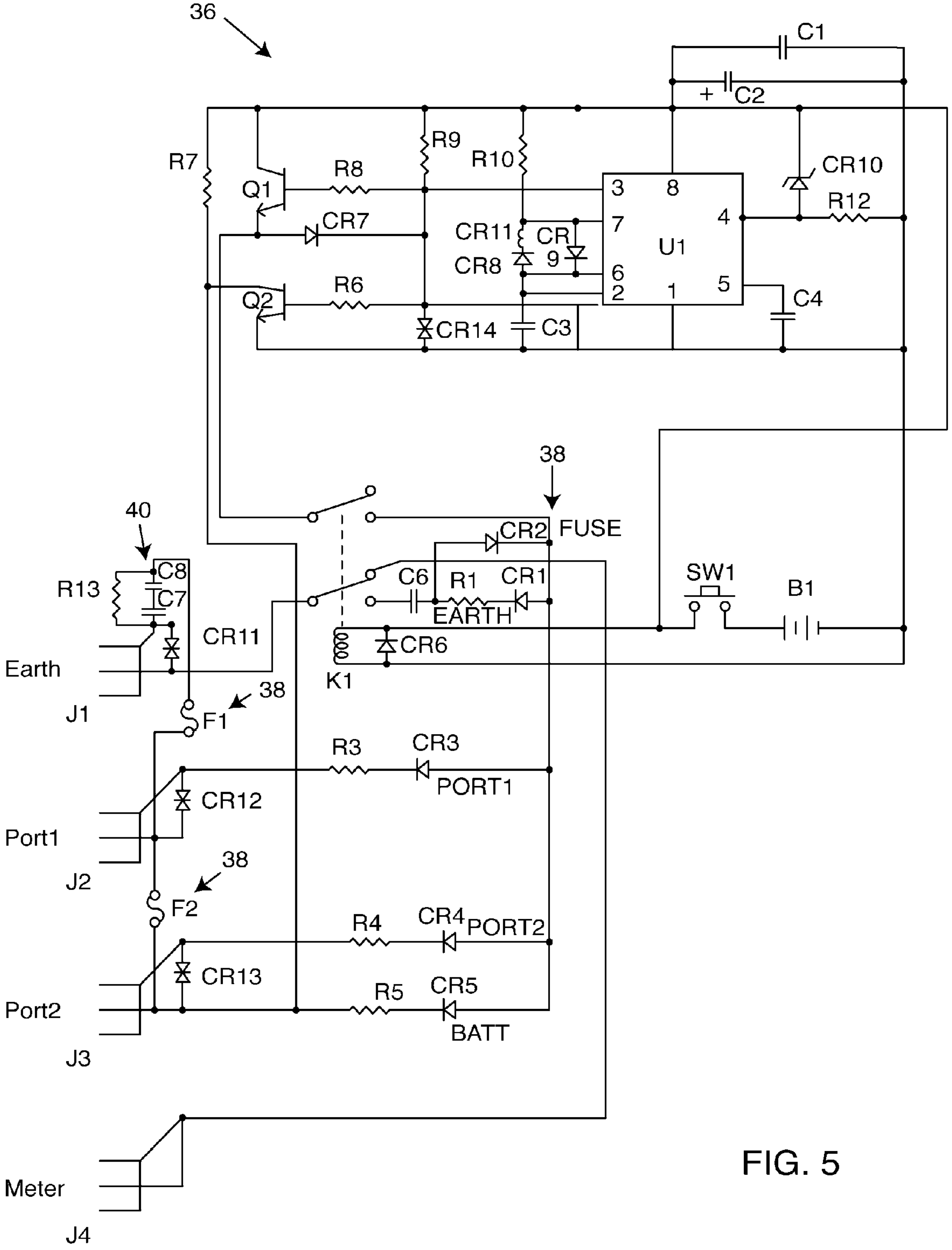
FIG. 5 is an electrical schematic diagram for the monitor of the present invention.

The monitor 34 may be located within the housing 28 of the grounded anchor 20 or located near the grounding pad 12. FIG. 5 presents an electrical schematic diagram of the monitor 34 of the present invention. The monitor 34 may include a signal generating circuit 36 that would create and transmit the electrical signal through the ground leads 18 to the grounded anchor 20. When properly grounded, the system 10 would form a closed loop in the manner explained above. The signal received back by the monitor 34 would verify proper grounding. In an improperly grounded system, the monitor 34 would not receive a signal back thereby indicating an open circuit and no continuity to ground.

The monitor 34 includes a number of safety features. The monitor 34 may include fuses 38, the purpose of which is to prevent or minimize the effects of a sudden electrical power surge as may occur in an improperly grounded system 10. A power surge may also occur when a conductive powered appliance or power line contacts the user, the grounding pad 12, or the grounded anchor 20. The design is intended to protect the user from a sudden electrical power surge. In operation, fuses 38 would break the conductive path in the event of such a power surge.

Another safety feature is the use of a capacitor or a capacitor and resistor combination 40 to create an open circuit in the event of a sudden power surge. A capacitor or capacitor/resistor combination 40 would allow the continuous discharge of both AC and DC electrical signals in accordance with the basic function of the system 10. However, in the event of a sudden power surge the circuit 40 would immediately increase its relative resistance in the system 10. This sudden increase in resistance would lower the transmitted current of the system 10 in accordance with Ohm's law. This circuit 40 is depicted in FIG. 5. An additional safety feature inherent in this circuit 40 is the potential for either the capacitor or the resistor to open or "blow" in the event of a sudden power surge. This again would lead to an open condition that would be safe for a user.

Another safety feature is a powered in-line circuit which would continuously measure the electrical activity present in the system 10. In the event of an electrical power surge, the powered in-line circuit would immediately open, creating a safe condition. Such powered in-line circuit could be created using a transistor, op-amp or similar active electrical component. Such a circuit would function as a ground fault interrupter (GFI) circuit.

Another safety feature is an inherent resistive load within the system 10, which would decrease the electrical current transmitted through a user. The preferred embodiment of the system 10 contains a 50 kΩ internal load. While all conductive paths carry some inherent resistance this is a specific resistive load calibrated to allow a certain maximum current, which may be transmitted through a user. In the event of a 110 AC voltage current contacting the user an approximately 2 mAmp maximum current would be conducted. This is enough to alert the user to an unsafe condition, however, this is well below the 5 mAmp level considered potentially unsafe.

Figure 4:
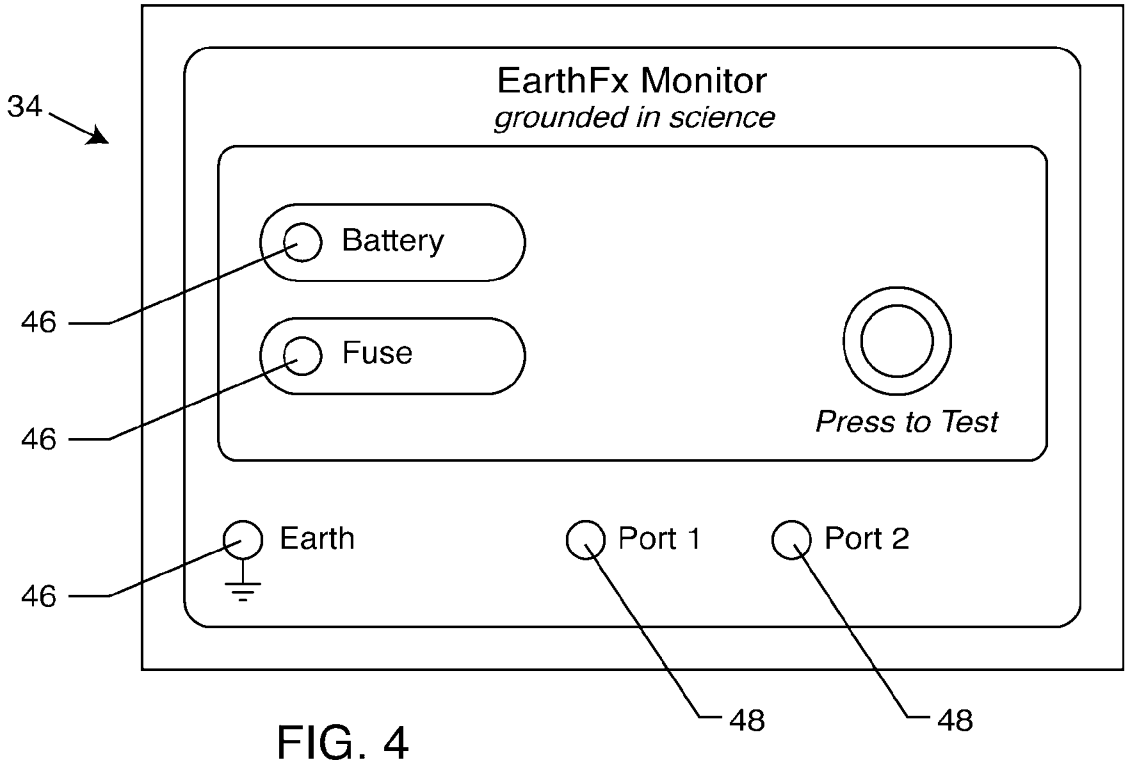
FIG. 4 is an illustration of the face of a monitor of the present invention.

The monitor 34 may also include a signal or indicator 46 and 48 to alert the user when any or all of the above mentioned features are functioning properly. The preferred embodiment of the monitor 34 uses LED lights as the signal or indicator 46 and 48. The monitor 34 may also include multiple ports or couplings 48 at which to connect various system components. These system components may include grounded anchors 20, meters 50, gauges 60, grounding pads 12, or other grounding devices. The preferred embodiment includes ports 48 at which to connect two grounding pads 12 as shown in FIG. 4. The signal or indicator 46 may also indicate that a system 10 is properly connected and has continuity to ground.

Each of these features may be incorporated into either the monitor 34, the meter 50, or any other system component in various combinations.

Figure 6:
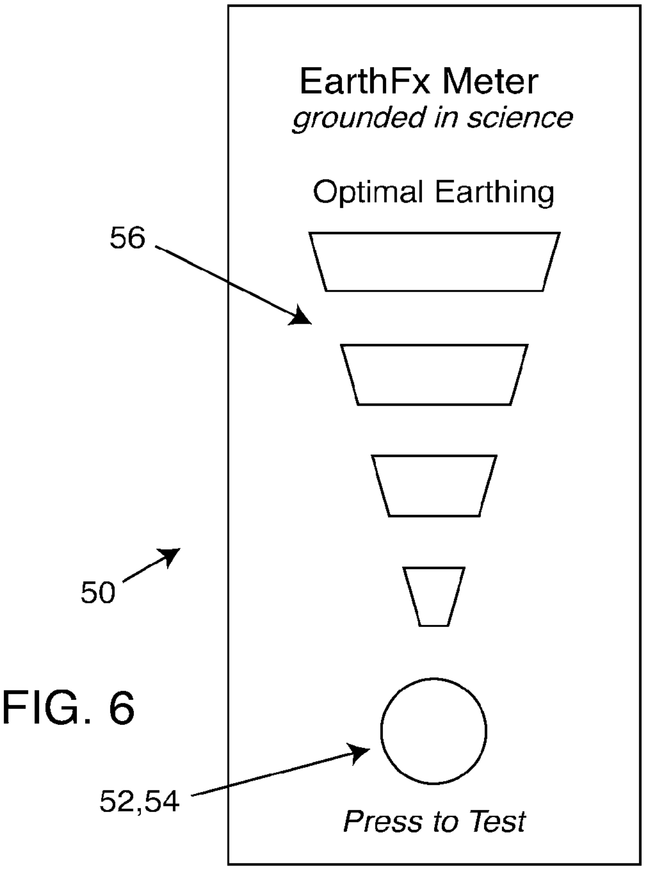
FIG. 6 is an illustration of the face of the meter of the present invention.
Figure 7:
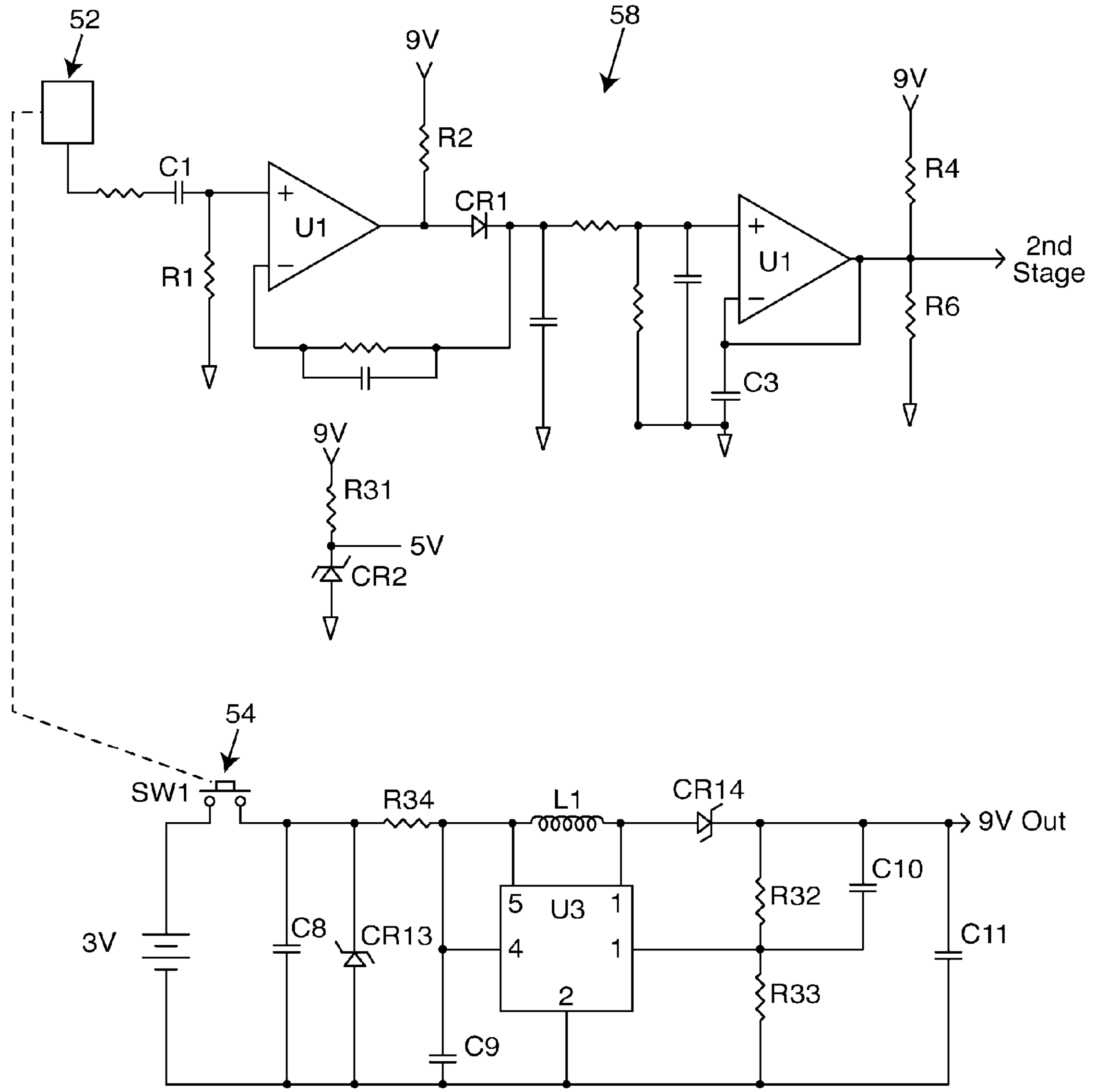
FIG. 7 is a first part of an electrical schematic diagram of the meter of the present invention.
Figure 8:
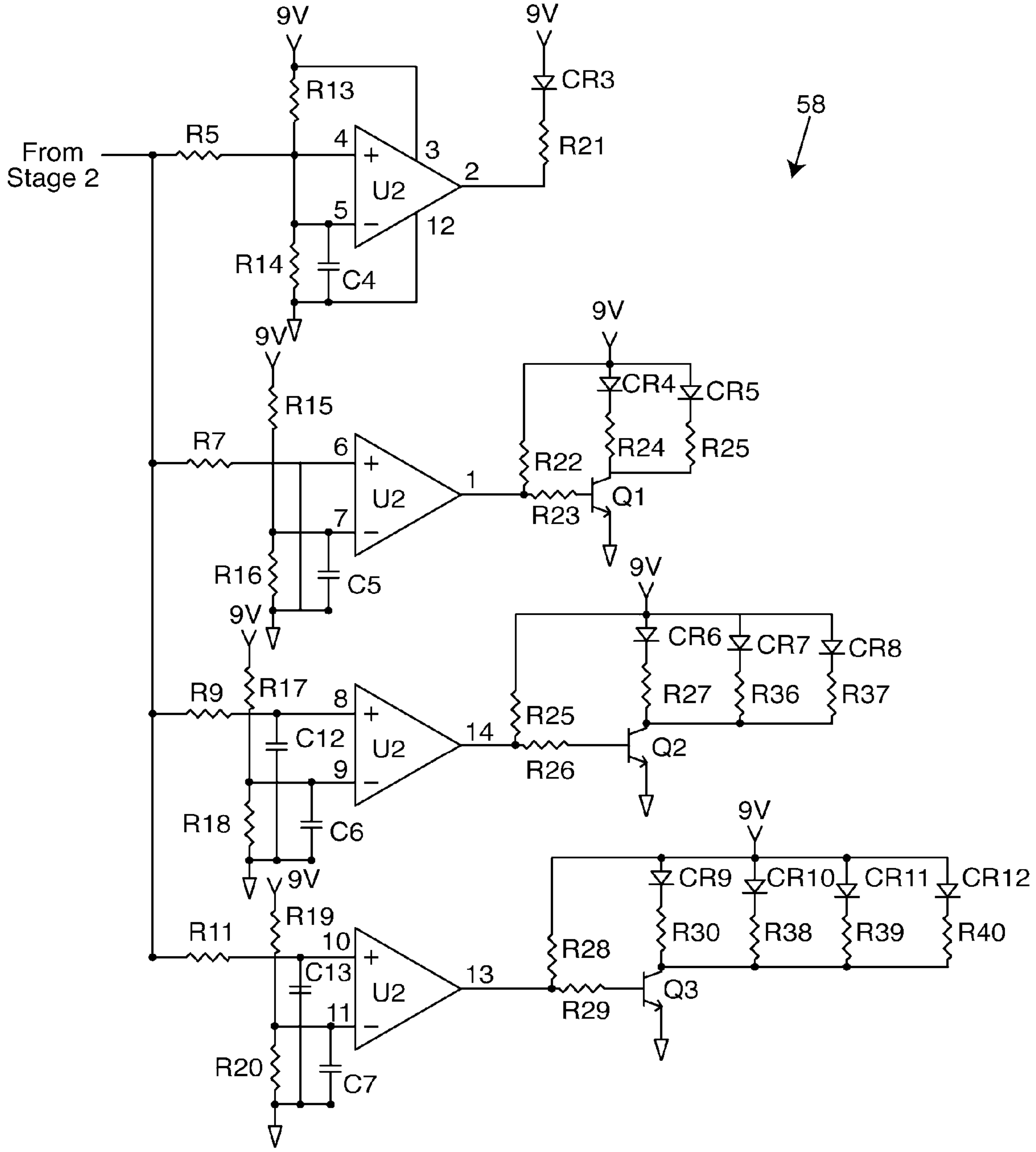
FIG. 8 is a second part of an electrical schematic diagram of the meter of the present invention.

The personal body voltage meter 50 depicted in FIG. 6 along with its electrical circuit 58 depicted schematically in FIGS. 7 and 8 measures the personal body voltage of a user. The meter 50 may be either digital or analog. In the preferred embodiment shown in FIG. 6, the meter 50 is analog in nature. The meter 50 has a human electrical contact point 52 as well as an activation switch 54. In the preferred embodiment, the human electrical contact point 52 and the activation switch 54 are one and the same. This configuration ensures that a user makes proper contact with the contact point 52 when activating the meter 50. In addition, the human electrical contact point 52 preferably consists of an exposed gold plated membrane. Gold plating reduces oxidation and allows optimal electrical contact with the human body.

The meter 50 depicted in FIG. 6 has an analog display 56 with a graduated scale of graphic representation. The display 56 may also include color coded lighted signals to indicate body voltage. The meter circuit 58 may include filtering components to give a clearer signal. In the preferred embodiment, the meter circuit 58 is designed to show the personal body voltage of 60 Hz AC. This is the preferred measurement in that most stray or unnatural electrical patterns within the human body will be at this frequency based upon present standard power line parameters.

Figure 9:
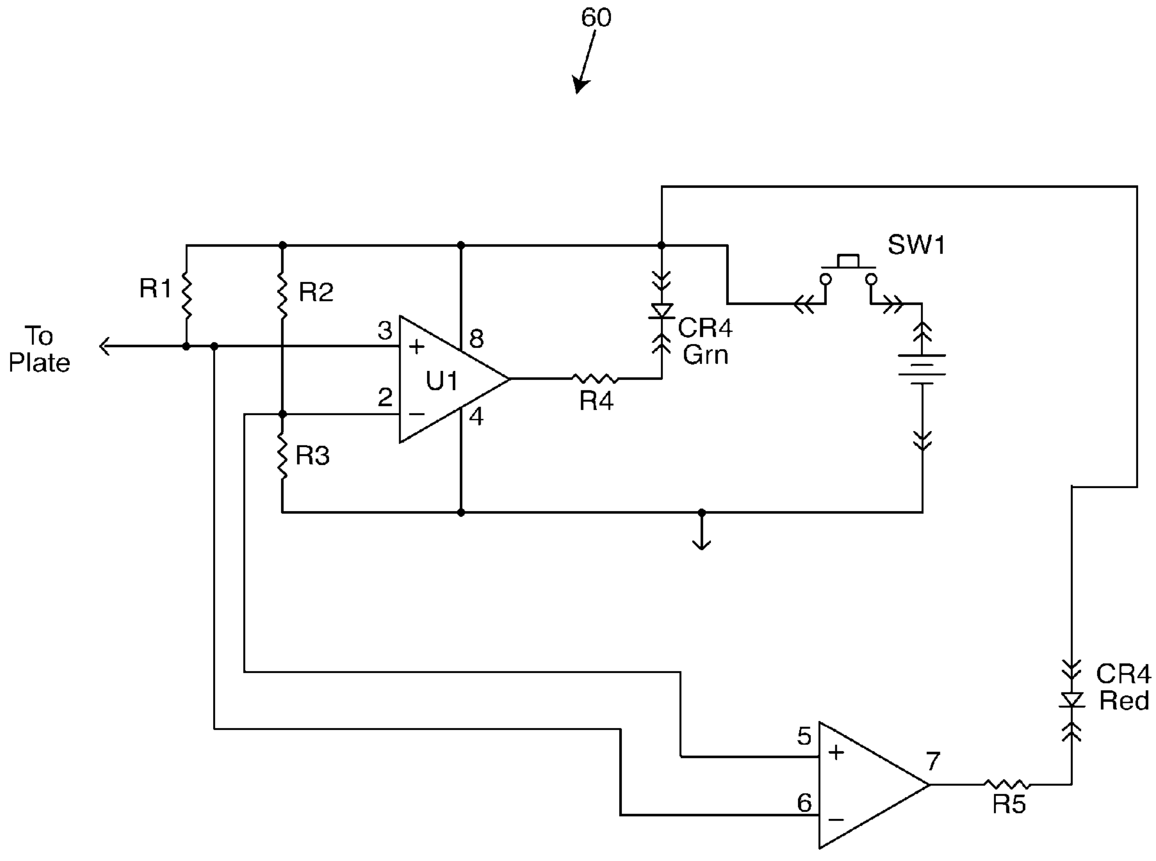
FIG. 9 is a schematic diagram of the personal body voltage gauge of the present invention.

FIG. 9 illustrates a schematic diagram of a system continuity gauge 60 for use with the present invention, to indicate whether a personal body grounding system is properly grounded. The system continuity gauge is a small hand-held portable device (not shown) having an electrically conductive coating or layer on one side. The electrically conductive coating or layer is preferably a thin copper patch on elastic foam conductively coupled to the internal circuits of the gauge 60. Copper is the preferred material for this electrically conductive coating or layer but any electrically conductive material will function as intended. The thinness of the coating or layer and elastic foam are intended to allow flexibility and contouring for improved contact with the personal body grounding system or other voltage item to be checked. The internal circuits check the voltage grounding level of the system to earth ground.

If a significant voltage reduction is attained through proper continuity, then the personal body grounding system is considered successfully grounded. Upon grounding, an indicator light flashes green or other means of notification activates when the gauge 60 is employed. If there is no contact or the personal body grounding system is not grounded, then an indicator light flashes red or other means of notification activates. In an alternative embodiment, the gauge 60 can activate without a manual switch.

Although several embodiments have been described in detail for purposes of illustration, various modifications may be made without departing from the scope and spirit of the invention.

What is claimed is:

1. A personal body grounding system, comprising:

a grounding pad including a mesh layer substrate comprised of a plurality of electrically conductive fibers and a conductor in conductive contact with the fibers, the grounding pad being configured to make field or conductive contact with a human body;

a plurality of ground leads having first ends conductively coupled to the grounding pad conductor;

a monitor electrically connected to the grounding pad for checking continuity to ground; and an anchor conductively coupled to second ends of the ground leads, wherein the anchor has multiple ground contact points or grounded rods.

2. A personal body grounding system of claim 1, wherein the conductor extends substantially across the mesh layer substrate.

3. The personal body grounding system of claim 2, wherein the mesh layer substrate is comprised of a plurality of carbon fibers.

4. The personal body grounding system of claim 3, wherein the conductor is conductively connected to the carbon fibers.

5. The personal body grounding system of claim 2, comprising multiple conductors wherein each of the plurality of ground leads are electrically connected to a separate conductor.

6. The personal body grounding system of claim 1, wherein the anchor has a plurality of grounded rods.

7. The personal body grounding system of claim 6, wherein each of the plurality of ground leads is connected to a separate grounded rod.

8. The personal body grounding system of claim 1, wherein the monitor includes a fuse to prevent or minimize the effects of a sudden power surge.

9. The personal body grounding system of claim 1, wherein the monitor includes a capacitor or capacitor/resistor combination to create an open circuit in the event of a sudden power surge.

10. The personal body grounding system of claim 1, wherein the monitor includes a powered inline circuit to create an open circuit in the event of a sudden power surge.

11. The personal body grounding system of claim 10, wherein the powered inline circuit comprises a transistor, op-amp, or a ground fault interrupter circuit.

12. The personal body grounding system of claim 1, comprising-a wherein the monitor has an inherent resistive load to decrease the electrical current transmitted through a user.

13. The personal body grounding system of claim 1, wherein the monitor has a signal or indicator means to alert a user of a potentially unsafe condition.

14. The personal body grounding system of claim 1, further comprising a personal body voltage meter to measure the personal body voltage of a user.

15. The personal body grounding system of claim 14, further comprising a gauge for measuring the continuity to ground.

16. A personal body grounding system, comprising:

a grounding pad comprising a sitting or sleeping pad and including a mesh layer substrate comprised of a plurality of electrically conductive fibers and a conductor in conductive contact with the fibers, the grounding pad being configured to make field or conductive contact with a human body;

a plurality of ground leads having first ends conductively coupled to the grounding pad conductor;

an anchor conductively coupled to second ends of the ground leads, wherein the anchor has multiple ground contact points or grounded rods; and a monitor electrically connected to the grounding pad for checking continuity to ground.

17. The personal body grounding system of claim 16, wherein the mesh layer substrate is comprised of a plurality of carbon fibers and the conductor extends substantially across the mesh layer substrate conductively connected to the carbon fibers.

18. The personal body grounding system of claim 17, wherein the grounding pad comprises multiple conductors and each of the plurality of ground leads are electrically connected to a separate conductor, wherein has the anchor a plurality of grounded rods and each of the plurality of ground leads is connected to a separate grounded rod.

19. The personal body grounding system of claim 16, wherein the monitor includes one or more of: a fuse to prevent or minimize the effects of a sudden power surge; a capacitor or a capacitor/resistor combination to create an open circuit in the event of a sudden power surge; an inherent resistive load to decrease the electrical current transmitted through a user; a signal or indicator means to alert a user of a potentially unsafe condition; or a powered inline circuit to create an open circuit in the event of a sudden power surge wherein the powered inline circuit comprises a transistor, op-amp, and/or a ground fault interrupter circuit.

20. The personal body grounding system of claim 16, further comprising a personal body voltage meter for measuring the personal body voltage of a user and/or a gauge for measuring the continuity to ground.

21. A personal body grounding system, comprising:

a grounding pad comprising a sitting or sleeping pad and including a mesh layer substrate comprised of a plurality of electrically conductive fibers and a conductor in conductive contact with the fibers, the grounding pad being configured to make field or conductive contact with a human body;

a plurality of ground leads having first ends conductively coupled to the grounding pad conductor;

an anchor conductively coupled to second ends of the ground leads, wherein the anchor has multiple ground contact points or grounded rods;

a monitor electrically connected to the grounding pad for checking continuity to ground, and including one or more of: a fuse to prevent or minimize the effects of a sudden power surge; a capacitor or a capacitor/resistor combination to create an open circuit in the event of a sudden power surge; an inherent resistive load to decrease the electrical current transmitted through a user; a signal or indicator means to alert a user of a potentially unsafe condition; or a powered inline circuit to create an open circuit in the event of a sudden power surge wherein the powered inline circuit comprises a transistor, op-amp, or a ground fault interrupter circuit;

a personal body voltage meter for measuring the personal body voltage of a user; and a gauge for measuring the continuity to ground.

22. The personal body grounding system of claim 21, wherein the mesh layer substrate is comprised of a plurality of carbon fibers and the conductor extends substantially across the mesh layer substrate conductively connected to the carbon fibers, wherein the grounding pad comprises multiple conductors and each of the plurality of ground leads are electrically connected to a separate conductor, and wherein the anchor a plurality of ground rods and each of the plurality of ground leads is connected to a separate grounded rod.

* * * * *